US008681417B2

(12) United States Patent
Mochizuki et al.

(10) Patent No.: US 8,681,417 B2
(45) Date of Patent: Mar. 25, 2014

(54) FAST RESPONSE ELECTROPHORETIC DISPLAY DEVICE

(75) Inventors: Akihiro Mochizuki, Louisville, CO (US); Laura Päit, Tallinn (EE); Madis Marius Vahtre, Tartu (EE)

(73) Assignee: Visitret Displays OU, Tartu (EE)

( * ) Notice: Subject to any disclaimer, the term of this patent is extended or adjusted under 35 U.S.C. 154(b) by 82 days.

(21) Appl. No.: 13/337,551

(22) Filed: Dec. 27, 2011

(65) Prior Publication Data
US 2013/0163066 A1 Jun. 27, 2013

(51) Int. Cl.
*G02B 26/00* (2006.01)
(52) U.S. Cl.
USPC .......................................................... 359/296
(58) Field of Classification Search
USPC ................... 359/296; 345/107; 204/450, 600; 430/32, 34, 38
See application file for complete search history.

(56) References Cited

U.S. PATENT DOCUMENTS

| | | | |
|---|---|---|---|
| 5,262,098 A | 11/1993 | Crowley et al. | |
| 6,127,283 A * | 10/2000 | Gal-Or et al. | 438/785 |
| 6,222,513 B1 | 4/2001 | Howard et al. | |
| 6,724,520 B2 * | 4/2004 | Kawai | 359/296 |
| 7,167,155 B1 | 1/2007 | Albert et al. | |
| 7,791,789 B2 | 9/2010 | Albert et al. | |
| 7,924,412 B2 | 4/2011 | Chopra et al. | |
| 8,040,594 B2 | 10/2011 | Paolini, Jr. et al. | |
| 2005/0173248 A1 * | 8/2005 | Fung et al. | 204/471 |
| 2010/0038600 A1 | 2/2010 | Liiv | |
| 2012/0211365 A1 * | 8/2012 | Joung et al. | 204/473 |

FOREIGN PATENT DOCUMENTS

| | | |
|---|---|---|
| WO | WO-2008/107989 | 9/2008 |
| WO | WO-2011/098154 | 8/2011 |

OTHER PUBLICATIONS

Clark, N. et al. (Jun. 1, 1980). "Submicrosecond Bistable Electro-optic Switching in Liquid Crystal." *Applied Physics Letter.* 36(11):899-901.
DeMario, M. (2006). "Large LCD Displays for Collaboration and Situational Awareness in Military Environments."*ADEAC 06 Technical Digest.* 75-77.
Hattori, R. et al. (2004). "A Novel Bistable Reflective Display Using Quick-Response Liquid Powder." *Journal of the SID* 12/1. 75-80.
Howard, M. E. et al. (1998). "Gyricon Electric Paper." *SID Technical Digest.* Paper No. 37.2: 4 pages.
Lin, A. et al. (2006). "LTPS Circuit Integration for System-on-Glass LCDs." *Journal of the SID* 14/4. 353-362.
McCreary, M. (2005). "Advances in Microencapsulated Electrophoretic Ink for Flexible Electronic Paper Displays." *IMID '05 Digest.* 234-235.
Miller, I. (2006). "8-3: VESA Monitor Command and Control Set (MCCS) Standard." *ADEAC 06 Technical Digest.* 90-93.
Preas, B. et al. (1998). "A Large Area, Tiled, Gyricon Display." *Journal of the SID.* 4 pages.

\* cited by examiner

*Primary Examiner* — Tuyen Tra
(74) *Attorney, Agent, or Firm* — Morrison & Foerster LLP

(57) ABSTRACT

New type electrophoretic display mode is disclosed in this invention. Theoretical analysis of dielectric materials as optical switching media leads to much stronger driving torque in an electrophoresis environment. Introduction of ferroelectric coupling torque in an electrophoresis phenomenon, extremely fast electro-optical response is realized. This extremely fast optical response enables full motion video image and full-color reproduction on an electrophoretic display. These two advanced functions makes an electrophoretic display as an extremely power saving full functional display.

13 Claims, 13 Drawing Sheets

Front-lit field sequential color electrophoretic display system

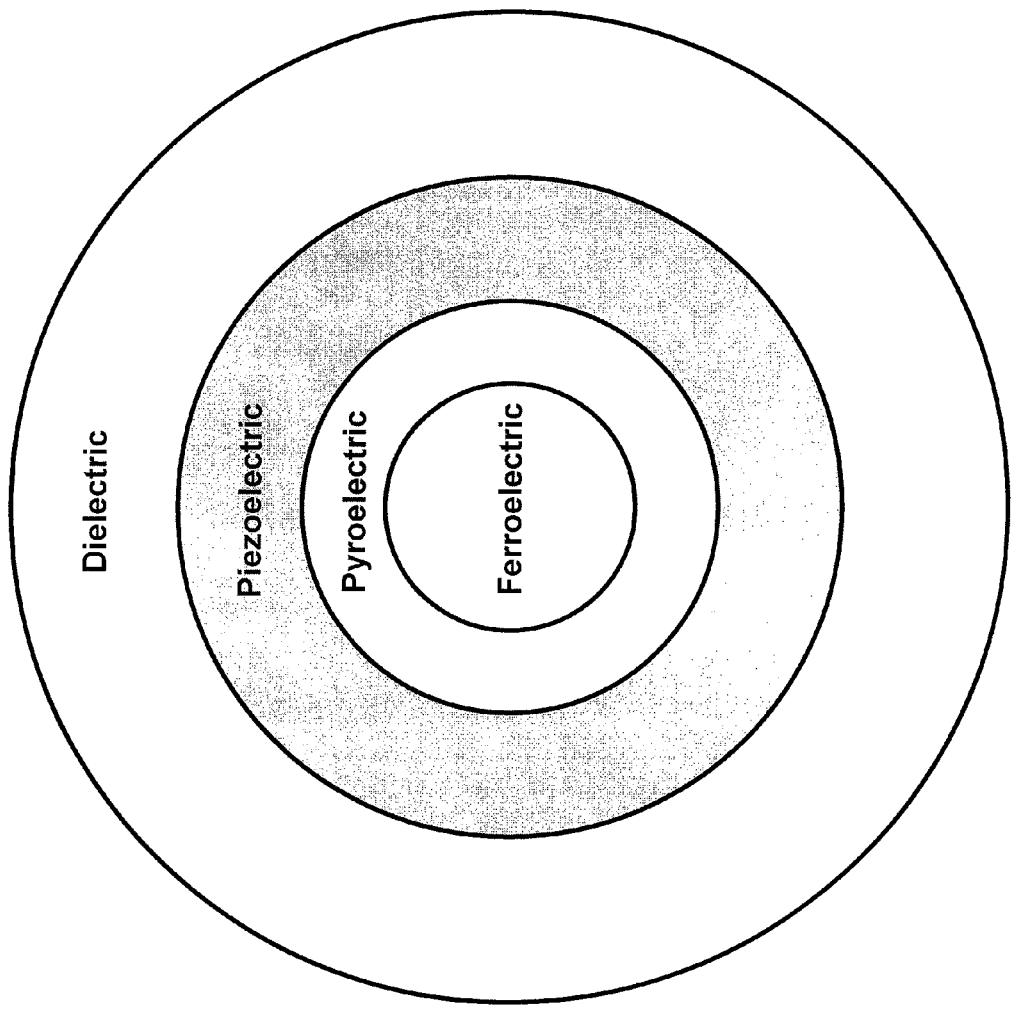
Figure 1. Classification of dielectric phenomena by their physical principle

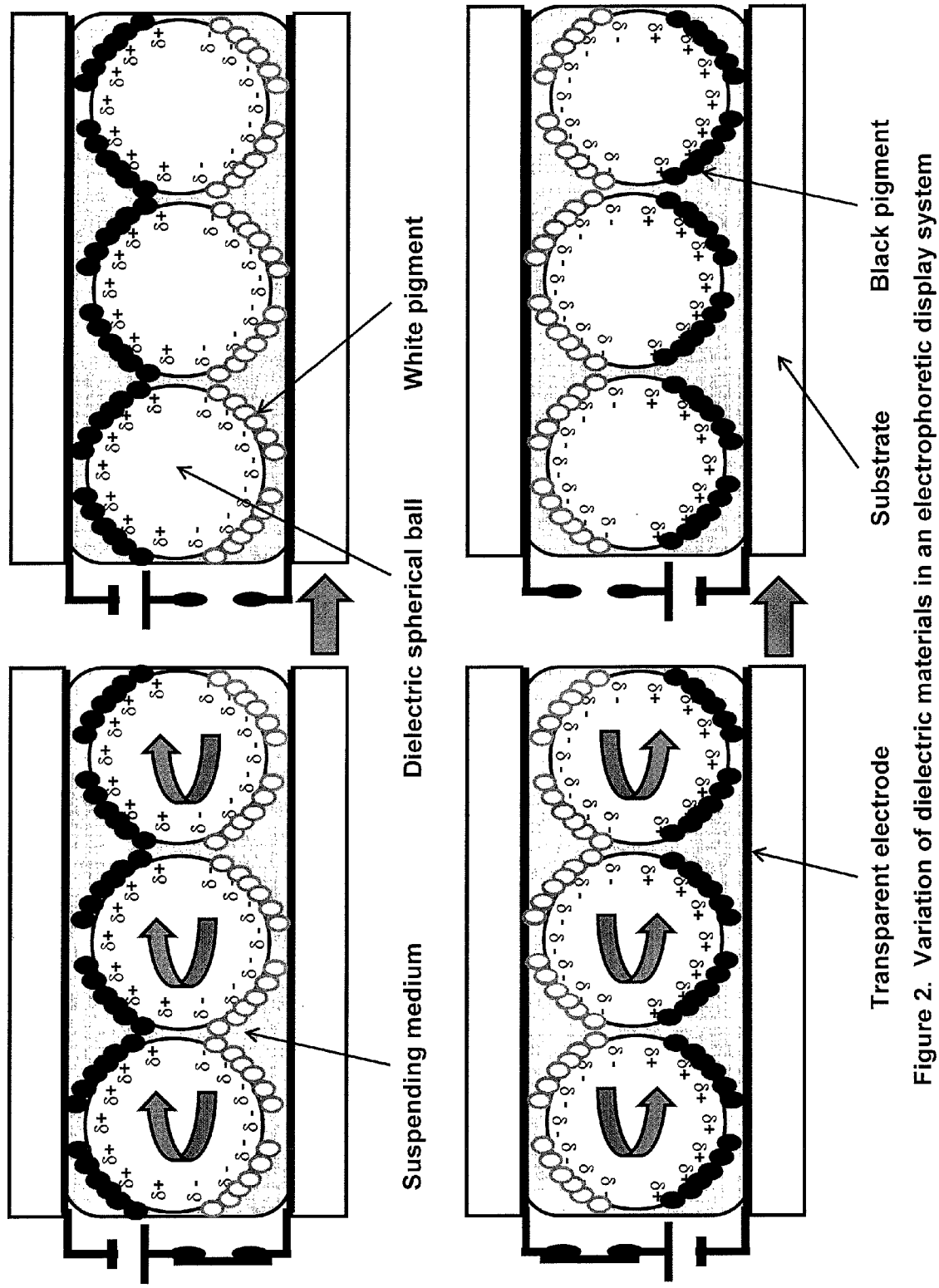
Figure 2. Variation of dielectric materials in an electrophoretic display system

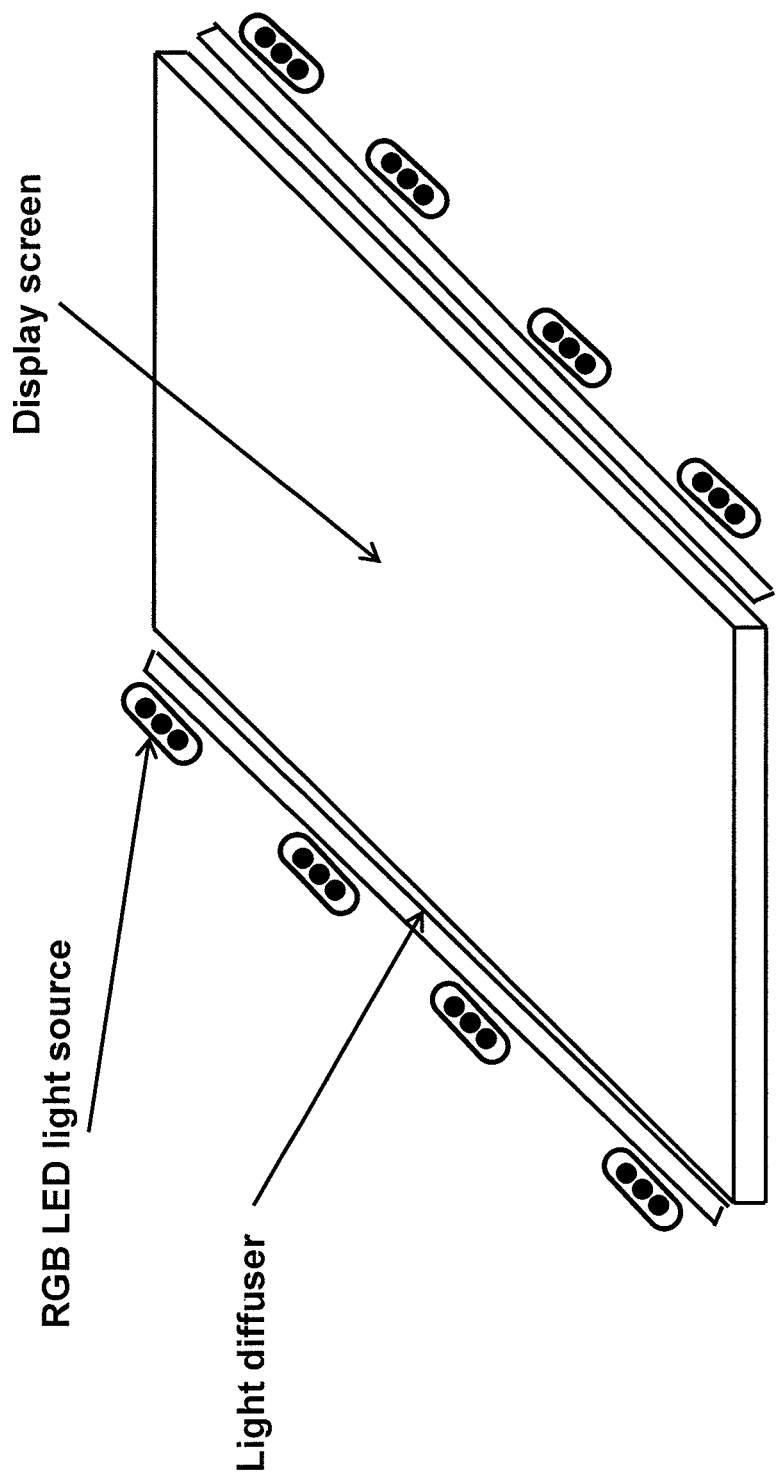
Figure 3 (a). Front-lit field sequential color electrophoretic display system

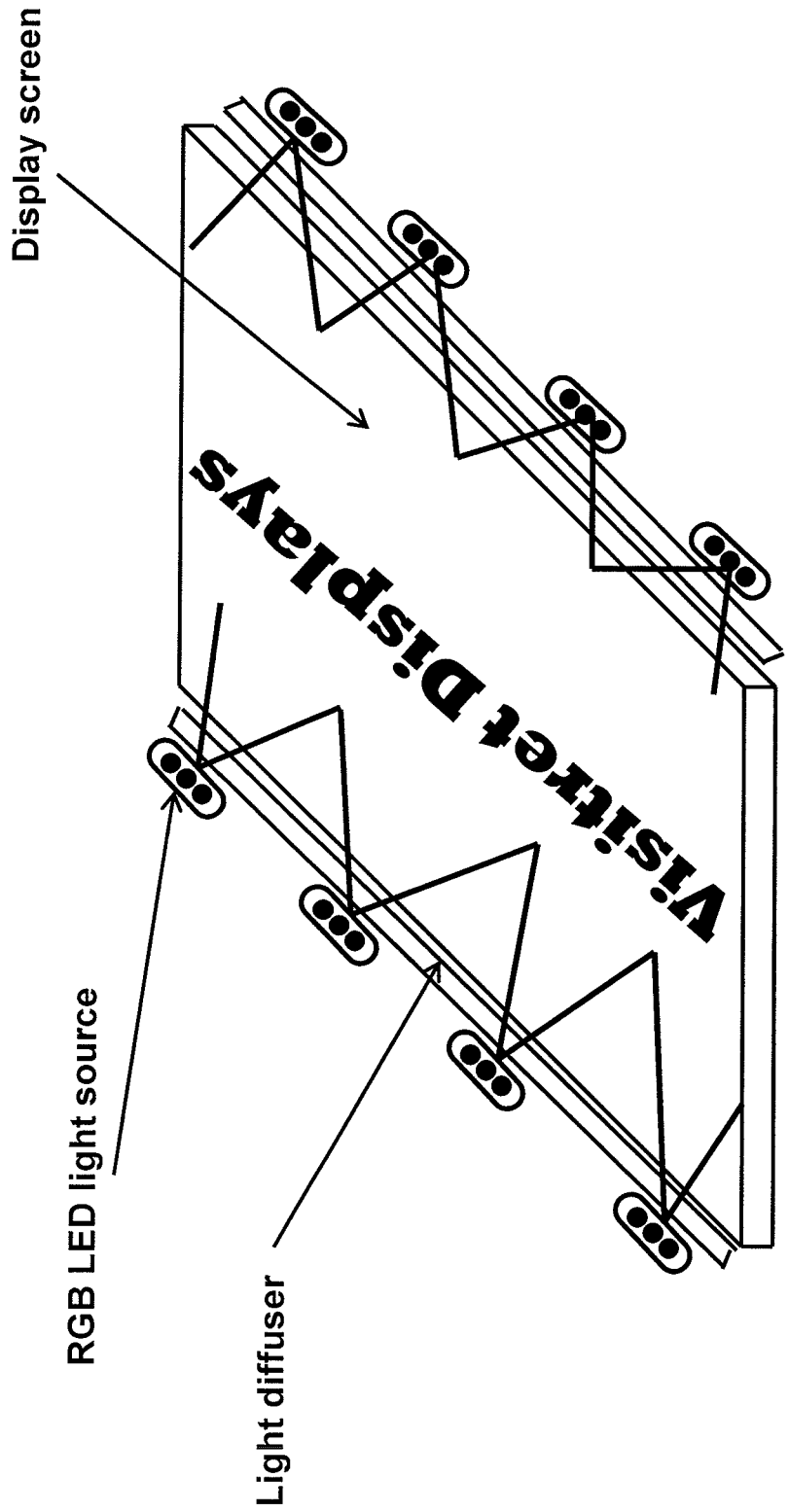
Figure 3 (b). Front-lit field sequential color electrophoretic display system displaying "red" image only

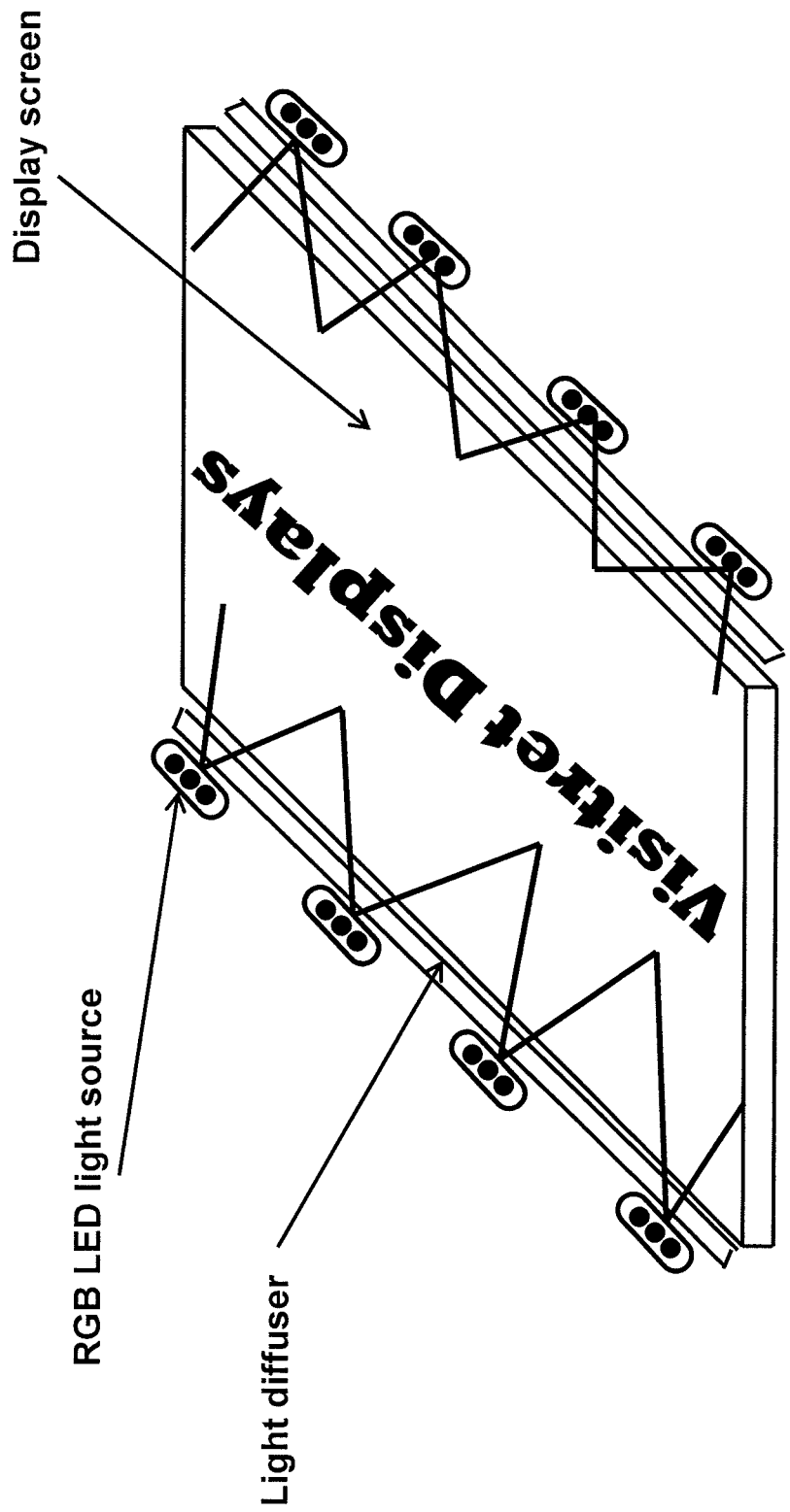
Figure 3 (c). Front-lit field sequential color electrophoretic display system displaying "green" image only

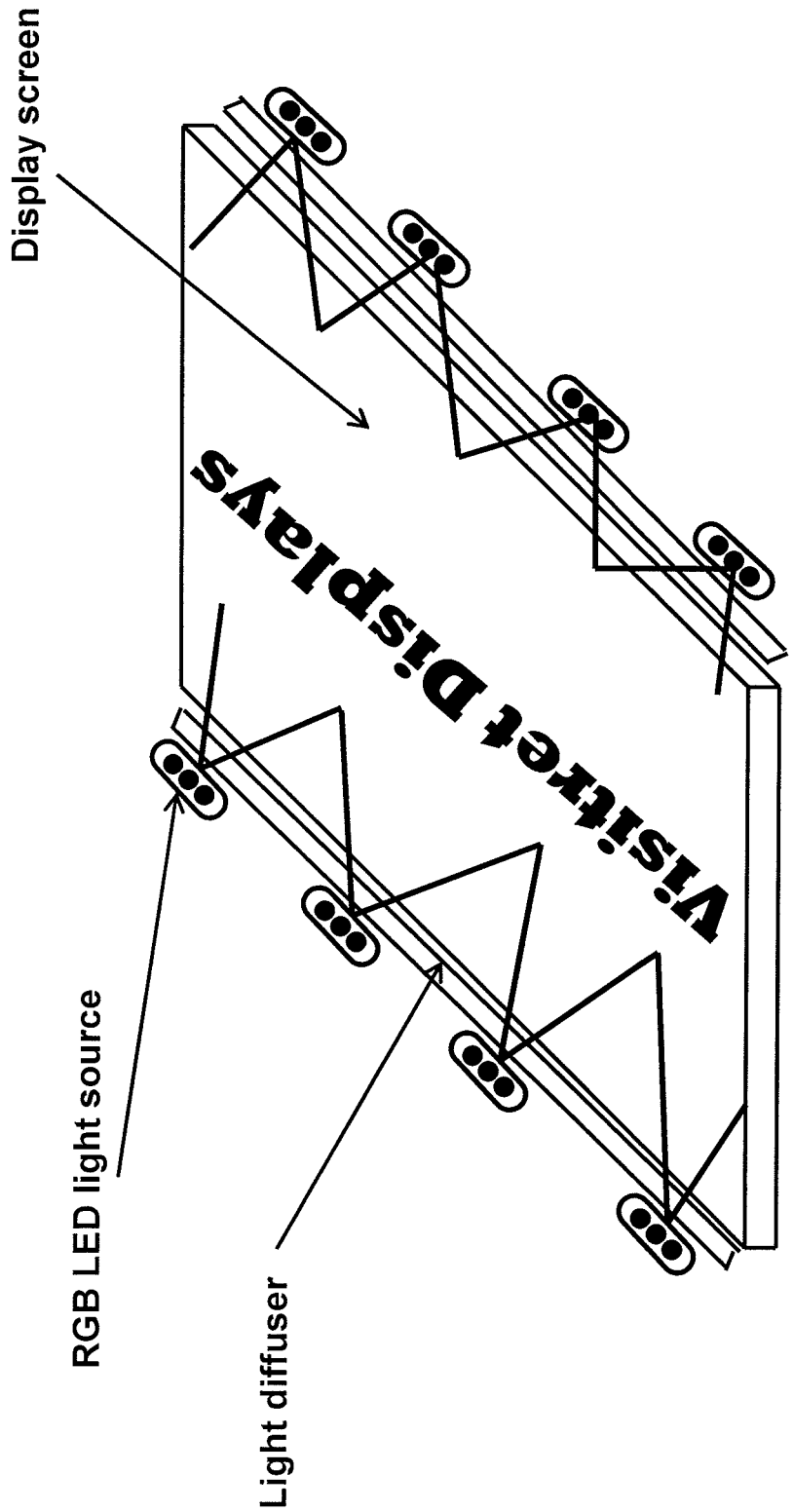
Figure 3 (d). Front-lit field sequential color electrophoretic display system displaying "blue" image only

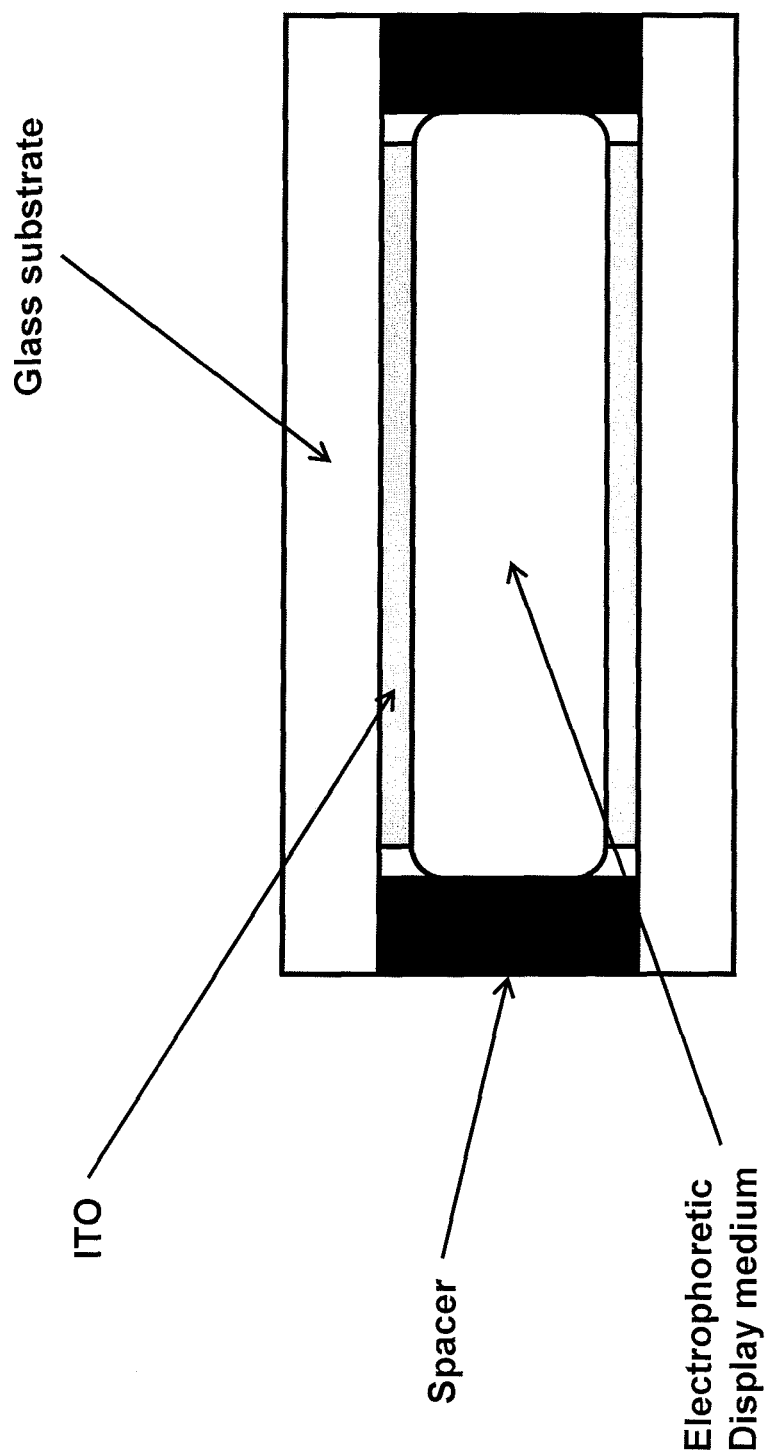
Figure 4. Sample configuration

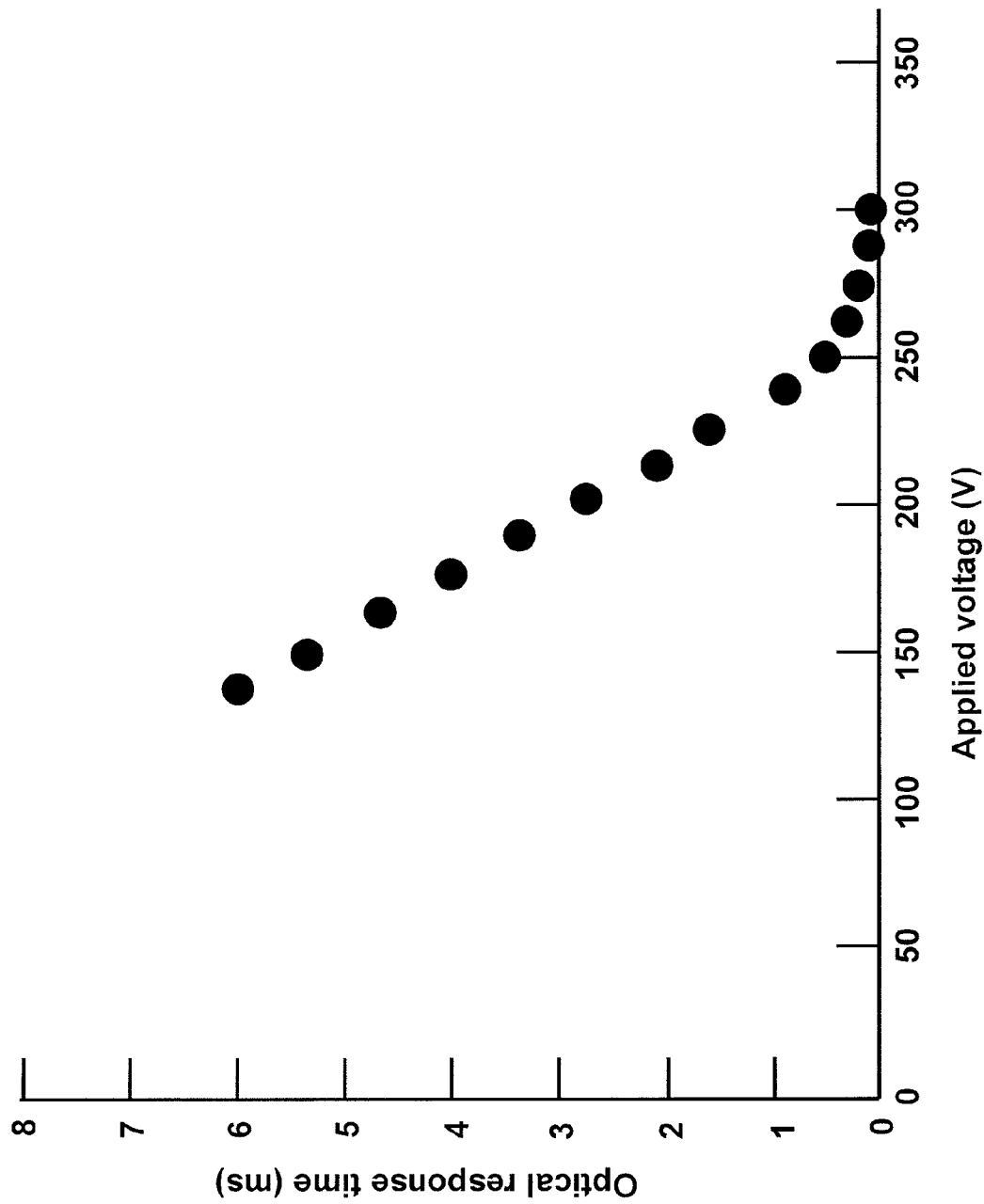
Figure 5. Electro-optic response of the sample using the invention technology

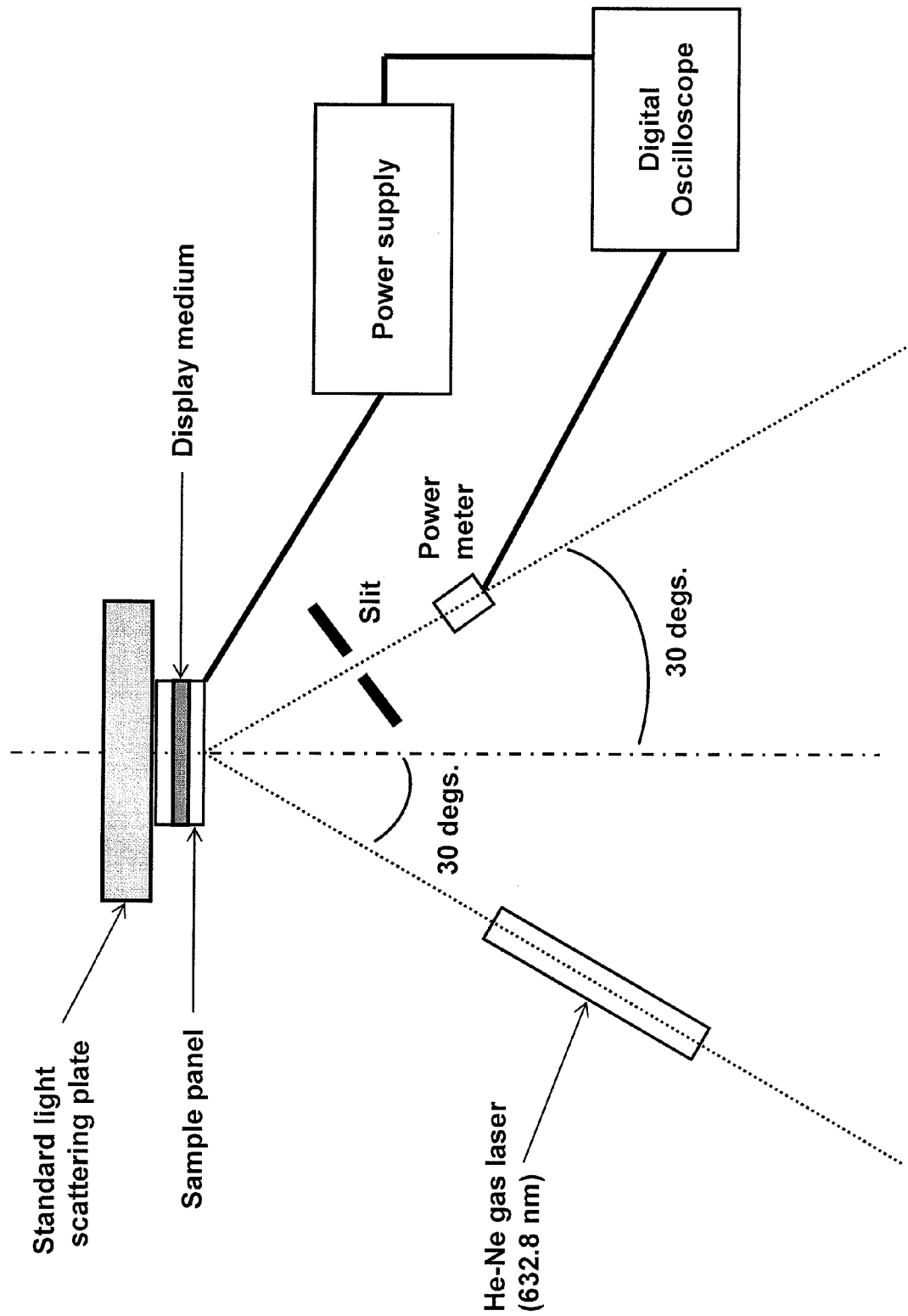
Figure 6. Scattering light Electro-optic measurement system set up

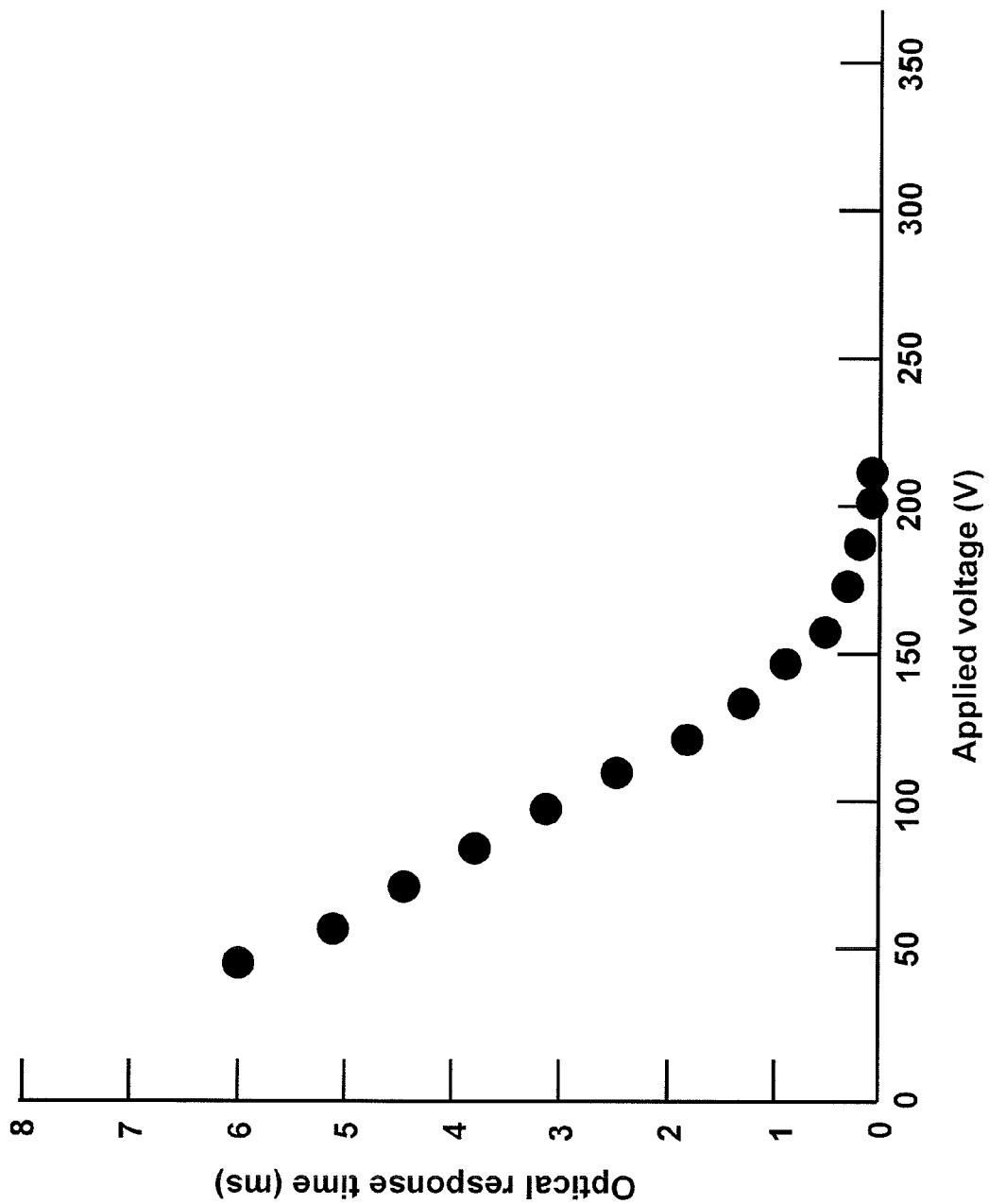
Figure 7. Electro-optic response of the sample using the Invention technology

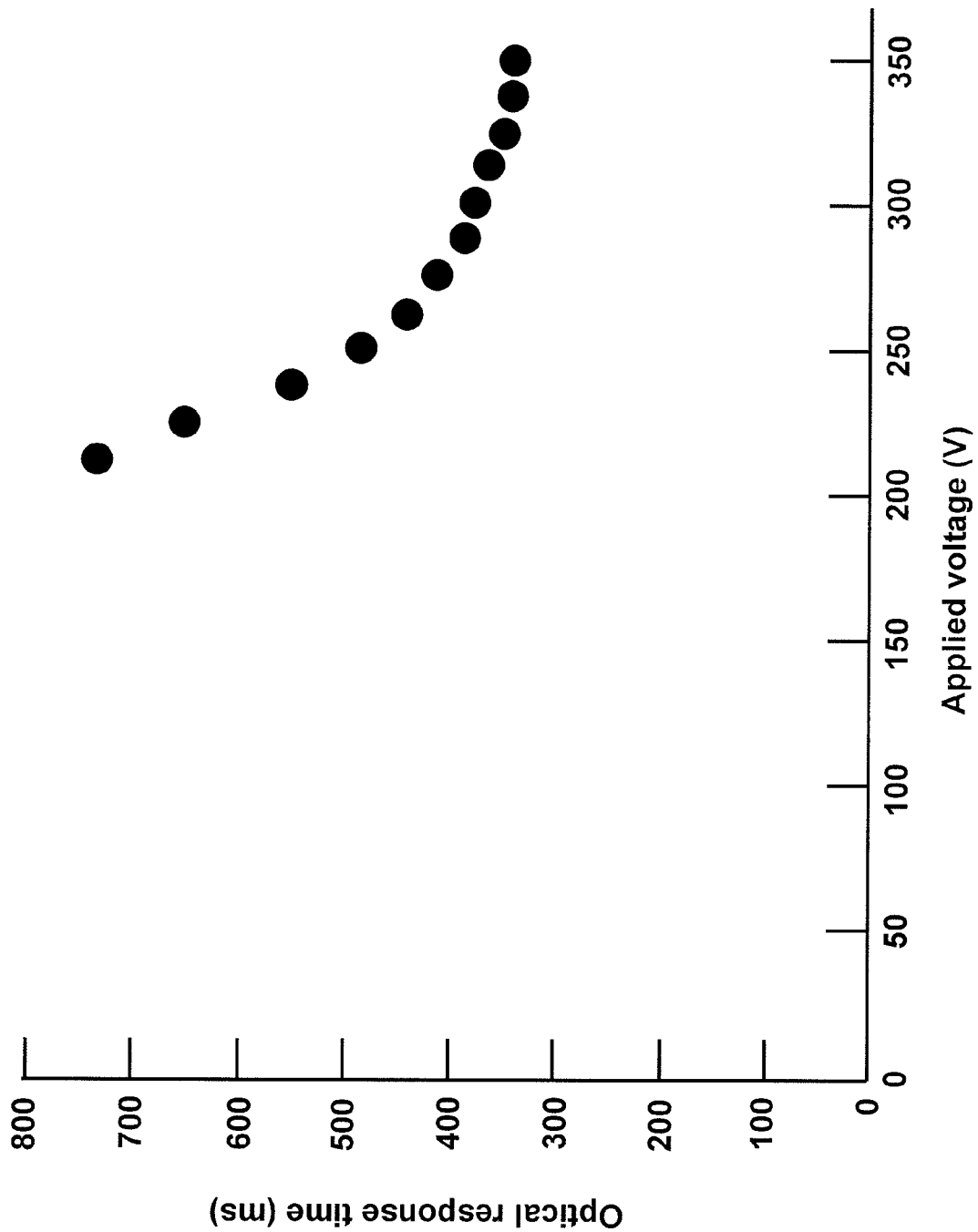
Figure 8. Electro-optic response of the sample using conventional technology

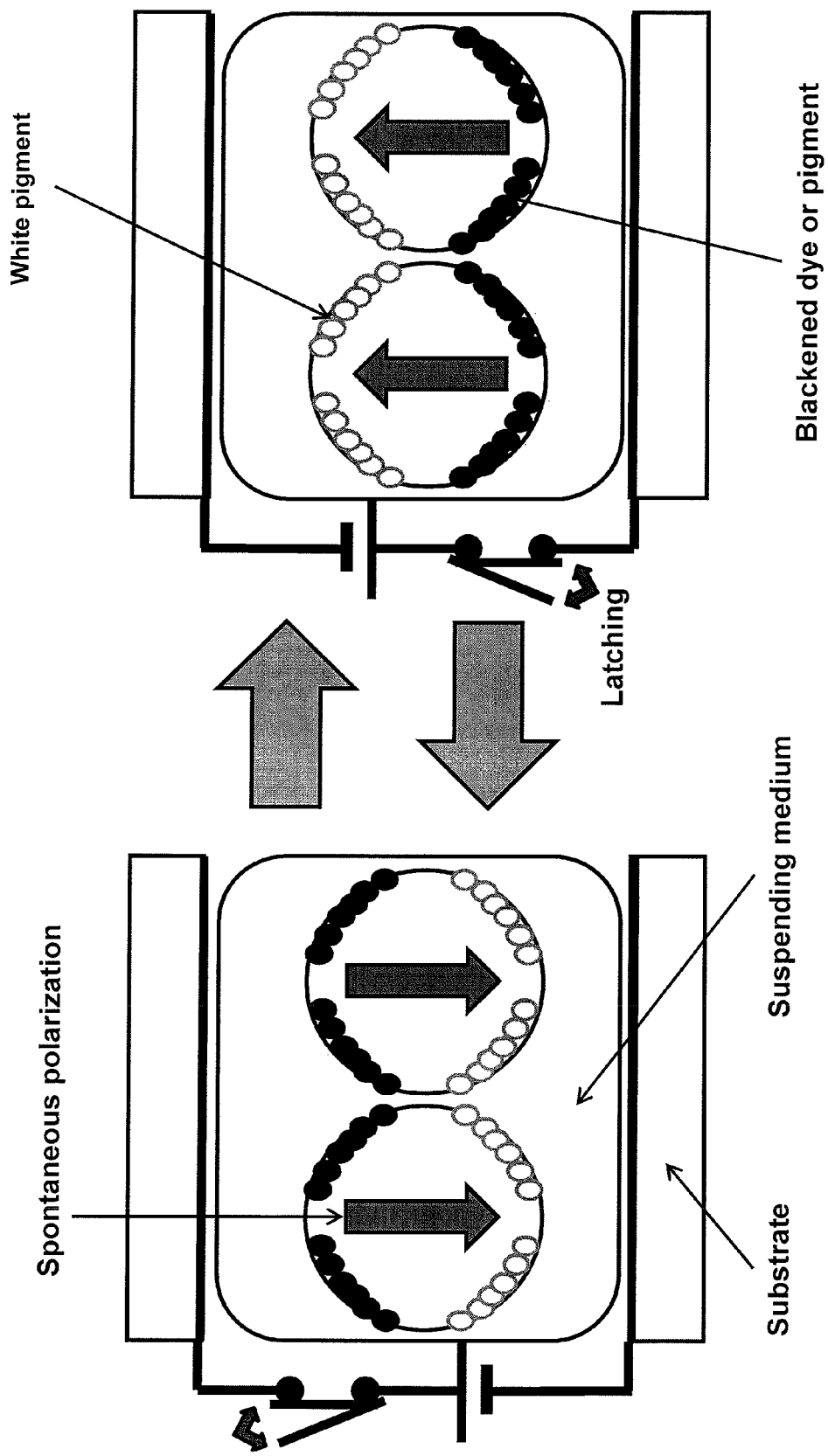
Figure 9. The ferroelectric coupling torque based electrophoretic display system using elastomer suspending medium

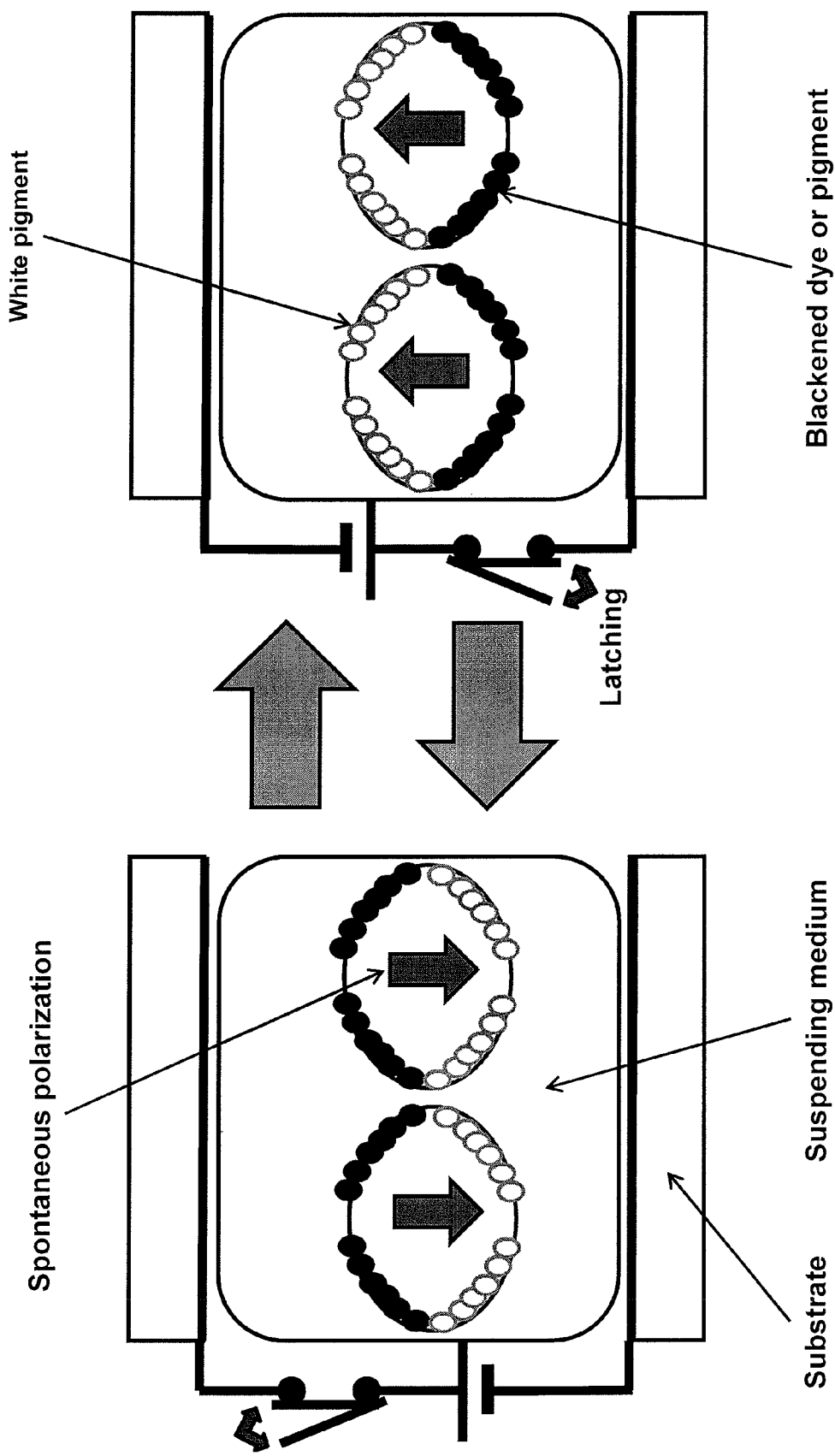
Figure 10. The ferroelectric coupling torque based electrophoretic display system using thixotropic suspending medium

FAST RESPONSE ELECTROPHORETIC DISPLAY DEVICE

BACKGROUND OF THE INVENTION

1. Field of the Invention

The invention relates to electrophoretic displays, in particular electrophoretic displays in which their driving torque is originated from a ferroelectric coupling.

2. Background of the Invention

Memory type display devices are attracting intense research and product consideration from the beginning of flat panel display industry due to the advantage in power consumption and readability under sun light ambient luminance condition. Some liquid crystal displays are being used for this purpose with their memory function. In past several years, some types of electrophoretic displays are widely in use, particularly in as so-called e-reader displays.

A memory function based reflective display technology is suitable for display devices specifically for character displays just as paper like image. Reflective nature of display image is also very suitable for replacement of paper media that is strongly required in terms of saving paper resources as well as electronic energy power saving point of view. A replacement of paper media point of view, it is quite natural that so-called an e-paper device has a display function of only still image. A memory function of those e-paper types of display modules saves their power consumption significantly thanks to their memory function. This significant power saving characteristic property is also good match with replacement of paper media.

On the other hand, a paper like electronic display device is strongly expected to have a function of so-called full color. It is quite natural requirement for an electronic paper type display screen to show full color image shown in a paper media. A full color characteristic property is one of the challenges for most of memory types or electrophoretic display devices. In principle, a memory function by display device medium does not show straightforward compatibility with full color display function. In most of memory type display technologies are based on bistability of display medium itself. Consequently, multiple screen luminance level display technology and memory state display technology have a fundamental difference in their principle of display functions. A typical memory function of display device itself uses so-called bi-stability, or alternative of two stable states. Therefore, memory function and gray scale reproducing capability based on multiple state stable states are incompatible. Regardless fundamental issue of multiple state stability, it is quite natural full color image on an e-reader is required. In order to obtain full-color function with state-of-the-arts technologies, a micro-color filter in conjunction with sub-pixels technology is widely used. This technology is based on spatial resolution limitation of human eyes. This state-of-the-arts technology is good enough to be used for so-called e-reader application based on bi-stability type display technology as long as it is applied to still images. However, unlike back light type display devices, reflective display's color recognition function is entirely dependent on ambient light luminance and major wavelength. Moreover, use of sub-pixel reduces image resolution at least to one third compared to the original image resolution. Therefore, for most of reflective displays, obtaining reasonable color purity level with good enough luminance display needs entirely new concept to get rid of its intrinsic characteristic properties.

Moreover, even an e-paper application, moving picture or video image reproduction is also somehow natural requirement in terms of required function as an e-reader. Under above requirements, entirely new types of power saving type displays with keeping good enough balance with memory type display's advantages are being required as an emerging technology.

Current so-called e-reader type display technologies are also expected to be applied digital signage type large bill board displays. As is well known, most of bill board types of large screen displays need specific illumination regardless self-emission and/or illumination system to enhance reflective nature of the screen. Although additional illumination system is required, a reflective display system keeps its specific advantage under bright enough luminance environment which is usual in fine mid-day in most of places worldwide. Of course, night time and very dark environment, more or less, specific illumination system is required. Even if such an illumination system is required, effective surface reflection of reflective base display gives more effective right reflection, resulting in significant power saving effect for large bill board types of display systems. Under current energy saving requirement situation in general, this better reflectivity is even effective for display systems required specific illumination systems.

SUMMARY OF THE INVENTION

This invention is directed to providing solutions to the problems discussed above. Based upon memory type reflective display's intrinsic function, this invention also enables both full-color function and good enough motion video images capability while maintaining the intrinsic advantages of the memory type display. As described above, one of the difficulties of memory type displays is to obtain good enough full-color capability and good enough motion video image capability while improving their slow optical response nature. Similar to conventional liquid crystal display (LCD) systems, slow optical response provides specific display image artifact. Current known electrophoretic display systems are even slower than that of typical LCD systems. Unfortunately, this naturally leads to difficulty for an electrophoretic display providing good enough full-color function and good enough motion video image function.

One significance of this invention is introduction of extremely faster optical response to electrophoretic display system with new concept of driving torque to display image creation medium. Enthusiastic and serious investigations both in terms of theoretical and empirical research have resulted in this new invention. Our theoretical research established 100 to 1,000 times faster optical response in intrinsically memory type electrophoretic display system compared to current known electrophoretic display systems. This extremely fast optical response is realized by introducing ferroelectric coupling torque with externally applied electric field to display medium. Although it is known that ferroelectric coupling provides much larger driving torque compared to dipole momentum coupling cases in general, any workable or realistic level of technologies in electrophoretic type display systems has not been demonstrated or suggested yet.

A surface stabilized ferroelectric liquid crystal display (SSFLCD: Noel A. Clark, et. al., "Submicrosecond bistable electro-optic switching in liquid crystal", Appl. Phys. Lett. 36 (11), pp. 899-901, (1980)) has been well known in these 30 years, SSFLCD case uses a ferroelectric liquid crystal material as its display medium. On the other hand, in the electrophoretic display filed, no driving torque has ever been provided by ferroelectric coupling based on the nature of an electrophoretic phenomenon. Moreover, unlike LCDs, in an electrophoretic display, the display medium consists of two to four different dielectric materials, resulting in non-straightforward dielectric properties issues due to complicated interaction among each dielectric material. As physics of condensed matter clearly explains, general dielectric phenomena are total materials ensemble effect. Therefore, single ferroelectric material case of an SSFLCD and multiple materials mutual related effect of electrophoretic case are fundamentally different both in terms of their physics and practical level of device configuration.

This invention provides both theoretical and empirical configuration of extremely fast optical response electrophoretic display systems based upon ferroelectric coupling torque. Thanks to ferroelectric coupling torque, not only extremely fast optical response, but also practical power saving display devices with illumination and full motion video image with full-color function are realized.

BRIEF DESCRIPTION OF THE DRAWINGS

FIG. 1 shows a classification of dielectric phenomena by their physical principle.

FIG. 2 shows variations of dielectric materials in an electrophoretic display system.

FIGS. 3(a)-3(d) show a front-lit field sequential color electrophoretic display system.

FIG. 4 shows an embodiment of the invention.

FIG. 5 shows electro-optic responses of the embodiment of FIG. 4.

FIG. 6 shows a scattering light electro-optic measurement system set up.

FIG. 7 shows an electro-optic response of another embodiment.

FIG. 8 shows an electro-optic response of the conventional technology.

FIG. 9 shows a ferroelectric coupling torque based electrophoretic display system using elastomer suspending medium.

FIG. 10 shows a ferroelectric coupling torque based electrophoretic display system using thixotropic suspending medium.

DETAILED DESCRIPTION OF THE INVENTION

Analysis of Specific Applications of the Technology

This particular invention was based on both fundamental investigation of dielectric performance and required and/or expected display performance as an electrophoretic display. Therefore specific requirement of each particular application of the expected electrophoretic displays is one of the most important factors in this invention. In this point of view, followings describe each particular requirement for a display performance of an electrophoretic display.

(a) E-Reader

This category of application has quite long history starting from use of black and white type LCD modules. In recent several years, memory types of electrophoretic displays are widely used in this category of application. The major benefit of the specific memory type electrophoretic display in this application is its paper like appearance that is relatively good reflectivity with somehow milky white light scattering as well as black light absorption at letter portion. The memory function of the display element saves display module power consumption. This memory effect enables this type e-reader similar to a paper based book. Therefore, the most important requirement for this particular category of application is stable memory effect of display element and good enough light scattering for image background with good enough light absorption for letter portions for good enough readability. This type of technology is disclosed by many published documentations such as "Advances in Microencapsulated Electrophoretic Ink for Flexible Electronic Paper Displays"; M. D. McCreary, International Meeting of Information Display (IMID) pp. 234-235, (2005), "Electrophoretic Ink: A printable Display Material"; B. Comiskey, et. al., Society for Information Display (SID) Technical Digest pp. 75, (1997), and so on.

Faster image writing time or screen refresh time is also important, but it is dependent on number of pixels, and also driving method in a display medium's memory function type display. In general, this particular application is as long as replacement of paper based books, writing time is secondary requirement. More important requirement than writing time is multi-color and/or full-color reproduction.

Regardless tremendous development efforts for good enough color reproduction function establishment such as known as U.S. Pat. No. 7,167,155 "Color electrophoretic displays", U.S. Pat. No. 7,791,789 "Multi-color electrophoretic displays and materials for making the same", and U.S. Pat. No. 8,040,594 "Multi-color electrophoretic displays", quality of color of this type of display is still under development. Since, providing good color purity and good enough color luminance are not easy for reflective type displays. In particular, subtract color reproduction is entirely dependent on ambient incident light color purity and screen luminance. On the other hand, backlight based LCDs have established their good enough color reproduction with combination between micro-color filter and color filter spectra fitting backlight unit system. Although backlight power consumption as well as refresh of screen image driving sacrifices significant amount of power, color reproducibility is fairly good regardless ambient light conditions. Current available electrophoretic display technologies still have significant advantages in their power consumption, however, color image quality is pretty poor compared to those of LCD images due to subtract reflection based color reproduction. In particular color reproduction by well-known technology that is using micro-color filter also decreases significant light throughput, resulting in dimming of screen luminance. For reflective type displays using ambient light as their light source, this light absorption by color filters provides significant drawback in terms of poor screen luminance. In order to avoid screen luminance reduction by using color filter, some experiments are using selective reflection of incident light to reproduce multi-color. International Application Publication No. WO 2008/107989 discloses three-layer stacking multi-color system using selective reflection of cholesteric liquid crystals. This method does not sacrifice image resolution by micro-color filter sub-pixels, and provide relatively large light throughput. However, this method has significant limitation in color purity due to the nature of cholesteric liquid crystal material's selective light reflection. Theoretically, selective reflection by cholesteric liquid crystal's helix has wide spectra distribution, so that obtained selective light reflection includes wide variety of light wavelength, resulting in somehow non-vivid color. Therefore, establishment of real meaning of replacement of paper based book requires some specific balance between current electrophoretic display's power saving benefit and current backlight based color LCD's superior color purity.

Although it is secondary requirement as an e-reader, motion video image capability makes this category of application much wider and productive in terms of content application development. The biggest challenge on motion video capability in the memory based electrophoretic display is inconsistency of the biggest benefit of a memory based electrophoretic display. Therefore, an electrophoretic display has been used for black/white based e-deader due to its display medium memory effect. This memory function is very effective to show still image just like current paper based books. On the other hand, reproducing motion video image requires time based image rewriting that requires a certain level of power consumption. Moreover, due to continuous image refresh requirement, display medium's memory effect is even avoidable matter. Therefore, in general for motion video image reproducing, memory function is not preferable. In order to realize practical and power saving motion video image multi-color and/or full-color displays, the specific balance between power consumption and display image performance is most necessary.

(b) Industrial Displays

This category of application actually has wide variety of display module types as well as their size and use environment. There are wide varieties of applications including traditional mechanical meter types, relatively new transparent type display unit to a pop type advertising display units. One is indicator types of application. The other application is so-called command control displays using relatively large sized screen such as described by Mike DeMario, et. al., "Large LCD Displays for Collaboration and Situational Awareness in Military Environment", ADEAC Technical digest pp. 75-77. (2006), and Ian Miller, "VESA Monitor Command and Control Set (MCCS) Standard", ADEAC Technical Digest pp. 90-93, (2006). This category of application is used for a control panel of measurement equipment, indicator displays for many varieties of measurement systems, vending machine displays, and so on. In particular, battery driven measurement machine has great benefit from extremely low power consumption type display module. This particular category's application usually requires relatively simple display contents such as alpha numeric and/or simple animation. A more concrete example is product price display and/or brief description purpose of displays called as a shelf display mainly for a glossary store or a retail shop. Relatively simple content of display such as pricing, product name and/or very brief product description are major contents. The most required performance for this category of display unit is good enough readability and extremely small power consumption. The other application is for product specification description purpose in replacing paper brochure such as specification for car sales. This type of application requires very high resolution of image as well as high information content with minimum power consumption. In the nature of this category of display devices, module design is highly customized and specialized to fit for specific equipment and/or occasion.

In spite of specific category, this category of display unit needs almost zero power while the display content is shown in the screen. On the other hand, this category of display does not require frequent refresh which means still images are of the most important requirement. Some applications would require multi-color, or even full-color, but usually not requires any animation function.

Also in these categories of products sometimes require extremely high resolution, high image contents, in particular for specification displays. For relatively low resolution, or small image contents display, a direct drive or small number of multiplexing drive methods are highly economical. For high resolution or high image content display unit, an active drive backplane is suitable. However, an active matrix drive backplane is used for under premise of motion video image or constant refresh type regardless showing motion video image or still image only, except for specific static memory type transistor embedded backplane such as Alex Ching-Wei Lin, et. al., "LTPS circuit integration for system-on-glass LCDs"; Journal of SID 14/4, pp. 353-362, (2006) that does not require image signal re-creation, but keeps one frame image signal at each transistor of the pixel. Although this static RAM type backplane has power saving function, in general re-flesh type drive trains usually require relatively not small amount of power regardless still image or motion video image reproduction. If the required information content is very high, and no need of refresh, using memory effect of the display medium, but not the transistor's memory effect. This type display medium memory function gives rise to theoretically unlimited number of strove lines.

(c) Large Screen Displays

This category of display module is usually in use for large billboard types of display. Both indoor and outdoor types are in use for large screen displays. One of the remarkable benefits of memory type electrophoretic displays for this particular application is its low power consumption during still image display. Unlike refresh type display unit, as long as the display image is still image, memory type electrophoretic display itself has zero power consumption. Most of usual application of billboard type display has large display screen size, and in general display power consumption is in proportion to screen area (screen size). Therefore, memory based electrophoretic larger display provides relatively lower power consumption benefit in comparison with refresh types of display unit. Moreover, memory type electrophoretic display is based upon its use model as a reflective display, so that as long as ambient luminance is good enough, even reflective display could save illumination light power. Usually, this illumination power is very large, so that power saving of illumination light is significant. Under dark ambient luminance condition, unlike self-emission types of display unit, electrophoretic display unit requires specific illumination light system. Even such an electrophoretic display unit requires an illumination system, as long as more efficient reflectivity is implemented, still its low power consumption benefit is considerable. In order to realize high enough reflectivity while keeping other required display performance such as color purity, number of colors so on, entirely new technology is highly expected.

A memory type reflective electrophoretic display is potentially good match with these types of large billboard display application. The difficulties in current known electrophoretic display technologies are overcome as follows:

Technical Requirements of Each Application (a) E-Reader

This category's technical missing matters are both color reproduction and motion video image capability. As described above, in principle, both memory effect which is good for power saving and motion video image capability which requires video rate of re-flesh are inconsistent each other. Most of pixelated matrix type displays need memory effect in some sense to keep good enough image quality regardless still image or motion video images. For instance, TFT (Thin Film Transistor) drive backplane uses at least single frame scan time of charge memory effect to avoid image degradation during frame to frame time interval. Thanks to TFT backplane side of memory effect, display medium has no need to have memory effect as the material. Instead of keeping memory function at display medium, TFT backplane keeps enough charge to keep the display medium image status until next frame of charge excitation is ready. On the other hand, without TFT backplanes, and without memory effect in display medium, much faster refresh or scrolling is necessary to keep image on the display screen to maintain good enough image quality. So-called multiplexing drive method in conjunction with passive matrix backplane is this case. In the multiplexing driving case, actually, some certain slow optical response of display medium is better to keep good enough image quality. Since extremely fast pulse rate such as several tens of kHz is usually applied for this type of driving, if display medium has optical response of sum-milliseconds, every time several kHz of excitation voltage pulse is applied, the display show small but crisp flickering. Therefore, this type of driving is rather suitable for slower response optical medium to avoid flickering image artifact.

To address this inconsistency, our focused investigation established the followings to solve these technical difficulties. Both of obtaining higher quality of color reproduction and motion video image capability with minimum or acceptable level of sacrificing of image holding power, following are important:

(1) Extremely fast electro-optical response in an electrophoretic based memory type display.
(2) Regardless extremely fast optical response, the display medium should have memory effect which enables shown image keeping without any power.
(3) Regardless of its memory capability, once proper electric signal is applied, the shown image must change its content by the newly applied electric signal.
(4) Good enough compatibility with current established flat panel display technologies The reason why above four bullet points are effective to solve this category of devices will be discussed below.

(b) Industrial Displays

Most of technical difficulty issue of this category of devices shares with those of e-reader requirement. Depending on specific application, some application requires much wider operational temperature rage compared to that for e-reader. Some application requires much higher contrast ratio compared to that for e-reader, and some application requires more mechanical robustness, and so on. Mainly, this category of specific technical difficulty is related to reliability issues including working environment issue.

One of the examples is gas pump meter display for automobile gas stand. Depending on climate environment, it requires relatively wide tolerance, but in general this particular application requires from −30 C to +75 C of operational temperature range as same as −40 C to +90 C of storage temperature range. Some liquid crystal displays (LCDs) satisfy these requirement at least temperature wise, however, still current commercially available display module has significant difficult to meet with other requirement such as good enough contrast and screen luminance with such a wide temperature range. Moreover, it is very difficult to meet mechanical robustness criterion. Therefore, in general, this category of display module needs to improve extremely wide temperature range requirement without sacrificing display image qualities. Moreover, mechanical robustness is one of the most challenges for all of display modules for this category of display application.

On the other hand, most of this category of display module does not require high color quality required for above e-reader application, moreover does not require motion video image. Therefore, technical difficulties of this category of display unit are keeping high enough contrast ratio and screen luminance in wide temperature range. This category of application has one more important requirement. It is durability to sunlight exposure. Many of these categories of display modules are in use as outdoor applications. Therefore, ultra violet (UV) exposure durability is also very important requirement. In short, following technical requirements are important:

(1) Wide enough both operational and storage temperature ranges.
(2) To keep good enough contrast and screen luminance in the wide enough temperature range.
(3) Sunlight exposure durability.

(c) Large Screen Displays

The most emerging application of this category is so-called e-signage. Traditionally, this category of application has been well known as a billboard type display screen. A large screen display including outdoor ball-park type score board display to indoor announcement board display, use environment and screen size are widely spread. Technical challenge of this category of display unit should be discussed both in terms of screen size and use environment.

For indoor type, current popular application is E-Signage at public service area such as an airport, a train station, a shopping mall corridor, and so on. These use environments are usually bright enough with ambient luminance, therefore, for most of memory display devices, it is good to use. Since those use environments are mostly kept quite stable ambient luminance condition, reflective type memory displays such as an electrophoretic display would be very effective in terms of its significant power saving capability as well as its consistent color quality based on sub-tract color mixing. Stable and consistent ambient luminance condition makes reflective type displays effective manner. Moreover, such ambient luminance environments are very much predictable of incident light angle to a reflective type display module. This makes reflective efficiency of the display unit maximize as well as consistent color quality. On the other hand, most of self-emission type E-Signage display modules including backlighted LCD module, such high ambient luminance condition degrades original screen image quality. Moreover, depending on ambient illumination spectrum condition, even color purity has not a small influence. Therefore, this particular indoor application field is good for most of memory type reflective display modules. On the other hand, most of self-emission type display modules is good for motion video image reproduction including full-color capability. A memory type displays, in particular a memory type electrophoretic display is very difficult to reproduce both motion video image and full-color image reproduction due to its memory based characteristics.

Above discussions clarify both merits and demerits of both self-emission type displays and memory type reflective displays. Table 1 shows summary of those. As Table 1 clarifies, self-emission type display units are very good in their motion video image reproduction capability, however, image quality is very much dependent on ambient illumination spectra and luminance with consistently large power consumption. On the other hand, memory based reflective display units are very good for color image adjustability and still image power consumption. However, the biggest technical challenge of the memory based reflective display unit is its poor to no motion video capability.

TABLE 1

General comparison of self-emission type and memory based reflective display for in-door use of E-SIGNAGE application

| In-door E-SIGNAGE | Self-emission display | Memory based reflective display (Current technologies) |
|---|---|---|
| Still image holding power consumption | In proportion to screen size | Zero regardless screen size |
| Motion video image power consumption | In proportion to screen size | In proportion to Screen size |
| Color image quality | Dependent on ambient illumination spectra | Consistently good |
| Influence of ambient illumination on image quality | Difficult to adjust | Adjustable |
| Full-color reproduction | Good | Poor to not available |
| Motion video image quality | Good | Poor to not available |

From above comparison, followings are important for memory based reflective display units of indoor application:

(1) Motion video image should be competitive with that of self-emission type displays.

(2) Full-color reproduction should be available.

General Approach to Overcome the Technical Challenges

As discussed above, a memory type reflective display has of its intrinsic advantages for above three categories of applications. Several memory type reflective displays are already known and used as actual display devices. For instance, (a) e-reader application: e-books, (b) industrial displays: glossary store's shelf price tags, (c) Large screen displays: ball park score board, are popular examples. Each actual in use type display unit has its own advantage. On the other hand, each application still requires specific display capability for wider and more effective use of each category's display unit as described above.

The inventors of this invention focused on investigation of most intrinsic technical background or fundamental requirement to solve each category's technical challenge. In this particular consideration, the inventors had the following fundamental mechanism study. Following is the description of the basic approach in this invention.

First of all, each category's technical challenges are sorted out comprehensively. Then, the total requirements are as follows:

(1) Optical response time should be extremely fast to meet with motion video image reproduction.

(2) Keep memory effect for still image holding.

(3) Extremely fast optical response should be realized with current available platform.

(4) Full-color reproduction capability.

(5) Wide enough temperature range.

(6) Durability as an outdoor display unit.

For motion video image reproduction capability, it is not only display media's sole matter, but need to consider drive scheme as well as drive backplane availability. Of course, regardless drive scheme, the display medium is absolutely required fast enough electro-optical switching capability. At the same time, drive train matching capability is also of its important requirement in terms of obtaining practical motion video image capability. For diverse application capability, both active matrix backplane drive such as TFT backplane drive, and passive matrix drive with multiplexing drive scheme are considered. With extremely fast optical response, full-color reproduction becomes realistic even for memory based reflective display system. Although it is not specifically for reflective displays' case, this basic concept has been well known as field sequential color method in these over 50 years. Most of pixelated displays use spatial resolved sub-color system. For instance, backlighted color LCDs, they have sub-pixel structure with each sub-pixel having primary color's color filter such as blue, red and green color filter. Using human eyes' limited spatial resolution, very tiny each primary color sub-pixel synthesizes full color image to human eyes. Field sequential color system uses time resolution instead of spatial resolution. Using human eyes' limited time following resolution, if a single pixel reproduces blue, red, and green color, respectively with extremely fast time frame faster than human eyes' time resolution, the single pixel synthesizes full color image in human brain. Therefore, if memory based reflective display system has fast enough electro-optical response capability faster than human eyes' time resolution, the display provides full-color image to human brain. At the same time, if the display image is still image and not necessary to rewrite for a certain amount of time, the display medium must has memory capability in its medium itself. Both motion video image reproduction and still image reproduction as well as memory function at keeping a still image must be operational applying current state-of-arts technology in order to the display device applicability realistic. Also both wide temperature requirement and durability of sunlight exposure should be basic materials selection matter, although some additional ways to avoid such technical issues are also possible consideration.

Based upon above comprehensive consideration, each principle technical requirement was investigated; how each technical requirement is overcome is as follows:

(a) Extremely Fast Electro-Optical Response to Meet with Field Sequential Color Requirement.

This requires at least 1 ms or shorter optical response time.

This level of electro-optical response is theoretically possible only by dielectric coupling with externally applied electric field and/or ferroelectric coupling with externally applied electric field.

(b) Keeping Effective Memory Effect

In order to keep effective memory effect, there are several ways. One is using magnetic element, one is using switchable molecular structure configuration changes such as cis and trans molecular structure configuration, one is switchable molecular or crystalline structure change, one is ferroelectric phenomenon.

(c) Reliability Requirement

There are proven reliable materials among current on market technologies. Some are materials' intrinsic reliability, some are device module's total performance such as using UV cut filters.

For reflective display nature, it is not easy to use UV cut filters in front of display screen to avoid significant light reflection. Moreover, significantly wide temperature range with minimizing display performance change is material's intrinsic characteristic property should be necessary.

Specific Considerations to Solve Technical Requirements

In order to realize faster electro-optical response for a electrophoretic display, Juri Liiv disclosed using polarized particles in an electrophoretic display in Estonian Patent Application No. EE200600031. This Estonian application and the corresponding U.S. application, Ser. No. 12/440,573 are incorporated herein in their entireties. This approach is based on piezo electricity to obtain fast optical response. Prior to this technology disclosure, Joseph M. Crowley et. al. in U.S. Pat. No. 5,262,098 disclosed use of dielectric coupling for electrically polarized dielectric balls under proper elastic medium. Also, Matthew E. Howard et. al. in U.S. Pat. No.

6,222,513 and Naveen Chepra et. al., in U.S. Pat. No. 7,924,412 describe related technology with the dielectric coupling for electrically polarized dielectric balls in an electrophoretic display. Both Juri Liiv, et. al. approach and above dielectric balls based approach was based on dielectric coupling torque as classified types of dielectric phenomena in FIG. 1. In FIG. 1, Sheridon, et. al is classified in the largest area at "dielectric", and Juri Liiv, et. al. is classified in the next nailed down area at "Piezoelectric".

Based on general understanding of condensed materials physics, each category's definition is following.

(1) Dielectric

Under certain externally applied electric field, the material shows some electric polarization.

(2) Piezoelectric

Under certain externally applied mechanical stress, the material shows some accumulation of charges. Also, those accumulation of charges create some mechanical changes of the material.

(3) Pyroelectric

Showing spontaneous polarization and the spontaneous polarization creates voltage potential by elevated ambient temperature.

(4) Ferroelectric

Showing spontaneous polarization and the spontaneous polarization can switch by externally applied electric field.

In general, in an electrophoretic display, specifically using bi-choromal balls, its optical response is discussed by M. E. Howard, et. al., "Gyricon Electric paper", SID Technical Digest, Paper No. 37.2, (1998). As Howard discussed in the patent, migration ion based movement show slow response such as several hundred milliseconds to up to several tens of hundreds milliseconds. Dielectric base coupling has capability to show much faster response. A liquid crystal display (LCD) case, most of LCDs use dielectric coupling and obtain several milliseconds response time. However, at an electrophoretic display case, due to suspending medium necessity such as elastomer material, dielectric coupling has some significant restriction right after the driving torque is applied to the specific dielectric materials which are usually spherical shape balls. Therefore, actual available optical response time of dielectric coupling based electrophoretic display is limited up to several tens of millisecond. Actual obtained response time is so far up to 50 to 60 ms ranges, though. Although it may be somewhat controversial if it is included in electrophoretic displays category or not, Reiji Hattori et. al., "A novel bistable reflective display using quick-response liquid powder", Journal of SID, 12/1, pp. 75-80 (2004) discusses non-use of suspending material. In this system, dielectric particles travel in air, resulting in faster optical response.

Above investigation showed the inventors that higher electrophoresis particle's mobility is most necessary as well as lower substantial viscosity of the sustaining medium. In order to have practical solution of above electrophoretic displays' issue, following theoretical investigation was carried out.

Theoretical Requirements to Overcome Current Technical Issues

In order to investigate electrophoretic particle's mobility in an electrophoresis system, its dynamic properties have been investigated. Von Smoluchowski described total electrophoresis phenomena by Materials Bulletin International Academic Science Cracovie; Vol. 184, page 184 (1903). Smoluchowski interpreted an electrophoresis phenomenon with total system energy point of view. Smoluchowski used the concept of electrophoretic retardation force: Fret. Total system energy should be zero regardless any electrophoresis situation as long as Debye length is smaller enough compared to the electrophoresis particle. Usually, a display application case, this Debye length condition is satisfied, therefore, following investigation is along with Smoluchowski's discussion. According to Smoluchowski, the electrophoretic mobility: $\mu_e$ is expressed by Equation (1).

$$\mu_e = v/E \qquad \text{Eq. 1}$$

Here, $v$ is velocity of a dispersed particle, $E$ is electric field strength. Using $\in_r$: dielectric constant of the dispersion medium, $\in_0$: permittivity of vacuum, $\eta$: dynamic viscosity of the dispersion medium, $\zeta$: zeta potential (kinetic potential), the electrophoretic mobility is also expressed by Equation 2.

$$\mu_e = (\in_r \in_0 \zeta)/\eta \qquad \text{Eq. 2}$$

Both Equations 1 and 2, velocity of a dispersed particle is;

$$v = E(\in_r \in_0 \zeta)/\eta \qquad \text{Eq. 3}$$

Equation 3 suggests the electro-optical response time of a dispersed electrophoretic particle is in proportion to applied electric field strength, dielectric constant and kinetic energy, and reverse in proportion to dynamic viscosity of the dispersion media. Therefore, in order to obtain faster electro-optical response, larger dielectric constant of dispersion medium, larger applied voltage and lower dynamic viscosity of dispersion medium are effective.

In a practical electrophoretic display module, allowable electric field strength is somewhat limited. Using too high voltage is directly related driver cost issue. Thinner electrophoretic display medium helps to increase electric field strength, however, too thin medium loses both contrast ratio and screen luminance for reflective mode display. Lowering dynamic viscosity of the dispersion medium is very much effective to reduce electro-optical response time. Nick Sheldon, et. al. discloses use of thixotropic medium by International Application Publication No. WO2011098154 to obtain substantially low enough dynamic viscosity of an electrophoretic media by introducing thixotropic media instead of elastic materials for sustaining media. Thixotropic medium is very effective to obtain substantially low enough dynamic viscosity at an electrophoresis system. M. Miner also discloses more specific total mobility behavior of a dispersed particle in an electrophoresis system by Journal of Colloid and Interface Science; Vol. 189, pp. 370-375 (1997).

Based upon above investigation, the inventors found theoretical solutions of extremely fast electro-optical response as well as practical device designs to realize the theoretical investigation.

As shown in FIG. 1 as well as discussed above, dielectric material includes several types of materials. Dielectric material shows some electric polarization under certain externally applied electric field. As Smoluchowski discussed, in an electrophoresis environment, this polarization of a dispersed particle is somewhat shielded by electric by-layer effect of an electrophoretic medium. Therefore, actual effective dielectric constant of dispersed dielectric particle material is significantly weakened of its polarization effect. In this point of view, Smoluchowski's Equation (3) would be modified as Equation 4 using the actual effective working dielectric constant: $\in_{eff}$ of dielectric material as;

$$v = E(\in_{eff} \in_0 \zeta)/\eta \qquad \text{Eq. 4}$$

Equation 4, however, strongly suggests limitation of response time reduction by means of increase in dielectric constant of a dispersed material. Therefore, the inventors reached at entirely different driving torque sources for dispersed particles in an electrophoresis system. Electric by-layer is more or less shields polarization induced on the surface of dispersed particles. In particular this polarization shielding effect is also going stronger by stronger applied electric field strength. This particular effect also degrades expected increase effect of electric field strength. By introducing ferroelectric coupling, this degradation effect is minimized, more over actual working coupling torque with applied electric field strength is much stronger than those provided by dielectric material. Both FIG. 1 and the discussion above clarified that ferroelectric material has spontaneous polarization, and the spontaneous polarization can switch by externally applied electric field. By introducing ferroelectric material based dispersed particles in an electrophoretic system, above Equation 4 is modified as Equation 5 with ferroelectric particles;

$$v = E(\in_{eff} \in_0 \zeta)/\eta + E(P_s \zeta)/\eta_f \qquad \text{Eq. 5}$$

Here, $P_s$ is spontaneous polarization of the ferroelectric particle, $\eta_f$ is substantial working dynamic viscosity to ferroelectric particles. In Equation 5, ferroelectric coupling base dispersed particles have following relationship between two contributing terms of mobility.

$$E(\in_{eff} \in_0 \zeta)/\eta \ll E(P_s \zeta)/\eta_f \qquad \text{Eq. 6}$$

In order to have a practical electrophoretic display module, a ferroelectric particle should be dispersed in an electrophoresis system. As Equation 4 clarifies, ferroelectric coupling has linear to applied electric field strength: E, therefore, the fundamental response in terms of velocity to applied electric field of the ferroelectric coupling torque shows linear to applied electric field. Also as Equation 6 shows that the driving torque originated from dielectric coupling is much smaller than that originated from ferroelectric coupling torque. Therefore, both from Equations 5 and 6, it is obvious that a ferroelectric coupling torque provides extremely strong driving torque compared to that form dielectric coupling torque. This clearly suggests that ferroelectric coupling torque provides extremely fast optical response to an electrophoretic display.

As described above, introduction to ferroelectric coupling torque enables full motion video rate applicable optical response property on an electrophoretic display with keeping bi-stability memory function. Moreover, obtained optical response is sub-mille seconds range, therefore, this extremely fast memory type display system enables full-color reproduction capability. Following explains how this extremely fast optical response capability enables full-color reproduction.

Full-Color Reproduction Capability

One of the practical ways to obtain full-color reproduction capability using the extremely fast optical response memory functional electrophoretic display is explained bellow.

Using so-called active matrix backplane such as an amorphous silicon thin film transistor array (a-Si TFT array), field sequential color driving method is applied. For an effective and practical full-color reproduction, a front-lit type illumination is applied as illustrated in FIG. 3(a). Using shorter than 1 ms of optical response time characteristic property of this invention technology, first frame image is displayed on the screen in the illustrated in FIG. 3(b). Right after the whole screen image comes up to the screen, front-lit Red color LEDs are lit as shown in FIG. 3(b). At consecutive frame, whole screen image is written in the whole screen for Green image, then, front-lit Green LEDs are on as shown in FIG. 3(c), finally, Blue image is on the screen as shown in FIG. 3(d). When the image displayed on the screen is still image, the screen image signal is not necessary to re-writing. Simply time sequentially, Red, Green and Blue front-lit illuminator emits. For still image display case, exactly same image such as "Visitret Displays" is always on the screen, and illumination front lit light hits red, green, and blue time sequentially with rapid illumination color change, resulting in time domain color mixing for human eyes. Therefore, for still image display case, at display screen, there is no need to re-write screen image, and this no re-writing of screen image electronically saves not a small amount of power. In this situation, signal processing power is not necessary, and screen image is preserved as it is thanks to this invention's ferroelectric materials bi-stability nature. When the screen image is full motion video image, both illuminator and screen frame-to-frame image are synchronized its image and illuminating color.

In this field sequential color system, display element is required to switch at least 1 ms switching to avoid color braking image artifact. A typical required field sequential color display system needs to use total frame rate of at least 120 Hz. This requires RGB sub-frame rate of 360 Hz. Therefore, required optical switching time of the display medium is at least 1.4 ms (2.8 ms/2). However, in order to avoid color mixing, actual required response time is less than 1 ms. Therefore, theoretically, only ferroelectric coupling torque based electrophoretic display based on this invention enables full-color function with this described field sequential color system.

This field sequential color system also enables significant power saving compared to conventional liquid crystal display based field sequential color system. Thanks to the invention, this field sequential color system uses reflective mode, moreover, display medium itself has memory function. Therefore, illuminator light efficiency is intrinsically high. Also, display medium memory function enables zero-power for display image sustaining power as long as the display image is still image just like conventional paper book.

In materials point of view, both ferroelectric materials and anti-ferroelectric materials are classified in the same category in the FIG. 1. There are some differences between ferroelectric and anti-ferroelectric materials. Although there are some differences in these two types of materials, in terms of above stronger drive coupling torque point of view, same concept is applied to anti-ferroelectric materials cases with some certain proper modification in terms of dispersed particles preparation.

Practical Designs

Ferroelectric materials are mainly classified to following two types of materials as classified in Table 2. One is dislocation type represented by certain categories of ceramics materials such as $BaTiO_3$, $NaKC_4H_4O_6/4H_2O$, GASH, TGS. The other type is order-disorder type represented by certain categories of polymer materials, low molecular materials stacking such as PVDF (Poly Vinyliden Fluoride), odd number of polyamide, and ferroelectric liquid crystals, and so on. Using the invention, basic electrophoretic display principle is illustrated both in FIGS. 9 and 10.

TABLE 2

Two types of "Ferroelectric materials"

| Dislocation type | Order-disorder type |
|---|---|
| BaTiO$_3$<br>NaKC$_4$H$_4$O$_6$/4H2O<br>GASH, TGS | PVDF<br>Odd numbers of Nylon (Poly amide)<br>Ferroelectric liquid crystals |
| This is an intrinsic ferroelectric based on the material's crystal structure. Most of these types are inorganic metal oxide materials as well know by "ceramics". Most of these types of ferroelectric materials show Goldstone mode spontaneous polarization switching. | This is some sort of statistics type of ferroelectric. The structure has Some variation, and only a specific Structure shows ferroelectric property. Due to order-disorder base, most of this types of ferroelectric materials are organic materials such as polymer, and low molecular weight materials. |

FIG. 2 illustrates the mechanism of a conventional electrophoretic display which is based on dielectric coupling torque. Dielectric spherical shaped particles are coated black and white on their northern and southern hemispheres, respectively. These colorations are carried out by several methods such as pigment coating on the half hemisphere, or mixing nano-sized white and black pigments to prepare spherical particles by known process such as spin disk method and so on. Most of nano-sized pigments have their specific zeta potential and surface energy, using these specific surface phenomena, each color pigment is effectively coated on a certain side of hemisphere. These colored spherical particles are dispersed on sustaining medium as shown in FIG. 2. A typical sustaining medium is an elastomer. A proper concentration dispersed spherical particles in an elastomer show some dipole momentum due to coating of different dielectric materials on their northern and southern hemispheres. Since, two different dielectric materials are localized top and bottom sides of the particle, each particle has more or less dipole momentum. As illustrated in FIG. 2, once external electric field is applied to the display medium having dielectrically polarized particles and their sustaining elastomer, each particle has its own driving torque depending on direction of externally applied electric field. Until the externally applied electric field and each dielectrically polarized particle's total dipole momentum direction reach at the most stable direction, each particle continues its rotation. Once each dielectrically polarized particles dipole direction comes to the most stable position, even after removing externally applied electric field, the particle keeps rotated position. This provides memory state on the display screen. In this conventional electrophoretic display mechanism, its driving torque is dielectric coupling torque, and this torque needs to have competitive situation with friction between sustaining medium and each particle surface. This invention changes this competitive situation dramatically. Introducing significantly strong driving torque provided by ferroelectric coupling gives rise to extremely fast particle moving behavior.

FIG. 9 shows one embodiment of this invention, which uses an elastomer medium as its suspending medium. For smoother optical response, the ferroelectric particle has spherical shape, and for higher contrast ratio, the ferroelectric spherical ball has both black and white colorings. There are several ways to prepare spherical shaped ferroelectric particles. Using so-called nozzle jet system which is widely used for ink-jet printers is one of the means to prepare ferroelectric particles. Preparing solvent soluble ferroelectric polymer such as specific crystal type PVDF, the PVDF liquid is injected through a nozzle jet tip, making several tens of micron sized particles. These particles are arrayed on sticky tape widely used for silicon wafer process, then the top surface is colored by black dyed materials. After dried black colored dye, then same process is repeated on the other side of hemisphere with white nano-sized pigment dispersed ink material. FIG. 9 shows a case of elastomer as a sustaining medium. Using elastomer, even the driving torque based on ferroelectric coupling is strong enough, in order to minimize friction between the elastomer and ferroelectric particle surface, spherical shape whose surface area is the minimum under same volume compared to other shapes such as cubic is the best choice. The basic driving mechanism itself is similar to that of conventional electrophoretic display case as shown in FIG. 2. The difference between conventional case and this embodiment is both extremely fast particle movement due to strong ferroelectric coupling torque and ferroelectric coupling based specific behavior called as "latching". Unlike dielectric coupling torque, ferroelectric coupling torque does not require sustained working torque to each particle. Once good enough driving torque is created to each particle, even externally applied electric field is removed, each ferroelectric particle continues its move till it comes to the most stable state automatically. This is also beneficial in terms of faster drive voltage addressing. After each ferroelectric particle arrives at its most stable position, each particle keeps its position until next energized external applied voltage is applied. This provides very stable memory effect on the display screen.

FIG. 10 uses thixotropic suspending medium. In this case, the ferroelectric medium does not need to keep spherical shape. Unlike using elastomer as a sustaining medium, thixotropic medium shows Non-Newtonian fluid characteristic property. Since ferroelectric coupling torque is much bigger than that of dielectric coupling torque, once the ferroelectric coupling torque is generated at each ferroelectric particle, surrounding thixotropic medium of each ferroelectric particle suffers significant shearing power. Due to this strong shearing power, thixotropic fluid changes its effective viscosity dramatically in the local surrounding area of each ferroelectric particle. This dramatic lowering of effective viscosity even accelerates ferroelectric particle move. Moreover, as illustrated in FIG. 10, due to Non-Newtonian property of thixotropic fluid, effective viscosity reduction under ferroelectric coupling torque application does not limit particle shape with the minimum surface area which means spherical shape. Even oval shape as illustrated in FIG. 10 gives well enough fast optical response unlike the case of elastomer. Changing deployed particle shape is also beneficial to have more contrast and more reflectivity in terms of more effective use of particle surface area for display screen.

Theoretically, and practically, both the dislocation type and order-disorder type ferroelectric materials are applicable to above concept of this invention of electrophoretic displays. Depending on application purpose of electrophoretic displays, more specifically depending on pixel size, resolution, which type of ferroelectric materials is most suitable would be decided. For large sized billboard type display modules, usually required pixel size is large such as several millimeters to several tens of millimeters. In such a large pixel case, both ceramics based and polymer based ferroelectric materials are applicable in terms of practical preparation of ferroelectric particle preparation. For mobile displays or PC equivalent type of display applications, required pixel size is relatively small such as several hundred micrometer to several tens hundreds micrometer. For such small pixel applications, polymer materials and low molecular organic material's based ferroelectric materials are suitable, however, these selections of ferroelectric materials are not limited in above selections, and they are depending on specific application purposes.

The other matter need consideration is practical preparation of ferroelectric dispersion particles to make this invention practical, and working. There are several practical methods to prepare ferroelectric dispersion particles as following:

(a) Making small particles from ferroelectric sheet type PVDF film and/or ferroelectric polymer film such as Polyamide 11 (Nylon 11).

(b) Synthesizing small PVDF (and/or Nylon 11, and so on) particle with strong shearing to create well enough spontaneous polarization with proper temperature environment.

(c) Form small particle of PVDF (and/or Nylon 11, and so on), then making electronic polling for spontaneous polarization forming.

(d) Making small enough size of particle by milling metal oxide (ceramics) ferroelectric materials.

Preparation of practical working ferroelectric dispersing particles is not limited in above mentioned method. Depending on target display applications, material's selection is effective, in particular whether dislocation type ferroelectric materials (intrinsic ferroelectric materials), or order-disorder type ferroelectric materials (statistical ferroelectric materials) would be decided.

In regard to suspending medium selection for this invention, either elastomer or thixotropic media are applicable. When an elastomer medium is used as a suspending medium of the ferroelectric particle dispersion materials, the dispersion particle needs to keep spherical ball shape for its smooth switching. When a thixotropic medium is chosen as a suspending medium, the ferroelectric particle shape would have more variety in its shape. Also selection of suspending medium is depending on the application target of the electrophoretic display system, and not limited in above general classification of the ferroelectric particle shapes.

EXAMPLE (1)

Using ferroelectric PVDF sheet whose thickness is 80 μm, the sheet was punched out to average size of 200 μm diameter by using sharp needle chip. For thixotropic suspending medium, 5 centi-strokes of silicon fluid (Aldrich Chemicals) and silicon dioxide flakes are mixed with 5:1 weight ratio. After those two were completely mixed, 5 weight % of above prepared punched-out of PVDF particles are mixed with the thixotropic fluid. The original PVDF sheet has 10 nC/cm$^2$ of spontaneous polarization.

This mixture forms fairly viscous colloidal structured fluid. In order to stabilize the fluid, after this fluid left 24 hours at room temperature, this fluid was moved to next experiment. This mixture is sandwiched between two ITO coated glass substrates with 250 μm height of spacer materials as shown in FIG. 4. Up to positive and negative each 300 V with 30 Hz of rectangular waveform is applied to the panel. This panel showed up to 1 ms of optical response with above applied voltage as shown in FIG. 5. The response time was defined as 10 to 90% of total optical response profile between applied voltage and light intensity. This measurement was based on light scattering strength difference between two stable states of the PVDF particle. Therefore, contract measurement was not fulfilled. However, it is reasonably assumed that with proper coloration of the particles, this fast response electrophoretic display system also shows high enough contrast ratio. Moreover, by using multiple coloration particles, respectively, full-color reproduction is realized in conjunction with fast optical switching of the ferroelectric coupling torque particles. This optical response time measurement was used light scattering measurement system as shown in FIG. 6. The display medium is sandwiched between two transparent electrode substrates and located in front of standard light scattering plate as shown in FIG. 6. Incident laser light beam comes to oblique angle to avoid surface direct reflection. Scattered light by the display medium comes back to photo detector through a proper field of view decided by the slit. The detected light output is converted to voltage and measured its time dependent change by digital oscilloscope. The necessary voltage to create electro-optic change is supplied through the power supply. This measurement needed relatively high voltage to have fast enough optical response. However, voltage is not intrinsic requirement for ferroelectric coupling torque case. By reducing substantial viscosity of thixotropic medium as well as increasing spontaneous polarization, it is reasonably assumed of significant lowering of the drive voltage.

EXAMPLE (2)

Using ball-milling equipment, $BaTiO_3$ crystal material was milled up to 0.2 mm length size. These grained small particles of $BaTiO_3$ were mixed with the same thixotropic medium used for Example 1. The mixing ratio of $BaTiO_3$ was weight percent of 2 wt %. This mixture forms fairly viscous colloidal structured fluid. After 24 hours kept in room temperature condition, this fluid was sandwiched between a pare of ITO coated glass substrates with using 250 μm height of spacer materials as same as at the Example 1. As same as the Example 1, this sandwiched panel was applied with alternative positive and negative each up to 300 V with 30 Hz of rectangular waveform. This panel showed up to 0.5 ms of optical response time with above applied voltage as shown in FIG. 7. The response time was defined as 10 to 90% of total optical response profile between applied voltage and light intensity. This optical response time measurement was used light scattering measurement system as shown in FIG. 6.

EXAMPLE (3)

Control

Instead of using ferroelectric PVDF particles, almost same sized of poly-ethylene particles are mixed with the exactly same thixotropic medium. The mixing ratio was 7 wt %. The used thixotropic medium was same with that used in the Example 1.

This mixture forms fairly viscous colloidal structured fluid. In order to stabilize the fluid, after this fluid left 24 hours at room temperature, this fluid was moved to next experiment. This mixture is sandwiched between two ITO coated glass substrates with 250 μm height of spacer materials as shown in FIG. 4. Up to positive and negative each 300 V with 30 Hz of rectangular waveform is applied to the panel. This panel showed up to 360 ms of optical response with above applied voltage as shown in FIG. 8. The response time was defined as 10 to 90% of total optical response profile between applied voltage and light intensity. This measurement was based on light scattering strength difference between two stable states of the poly-ethylene particle. This optical response time measurement was used light scattering measurement system as shown in FIG. 6.

In the embodiments above, both full motion video and full-color reproduction capabilities enable an electrophoretic display as a full functional display. Moreover, the full functional electrophoretic display still keeps its power saving function. In particular, thanks to the ferroelectric characteristic property, even full color image is displayed, as long as the image is still image, all of screen image sustaining power is not necessary by using display medium's memory effect, except for color illumination power.

The full function display performance makes the electrophoretic display applicable to wide varieties of application field while keeping electrophoretic display's inherit function. In particular, reflective nature of the electrophoretic display is suitable to sun light readable application both a small handheld type to a large billboard type display systems with minimized required power.

What is claimed is:

1. An electrophoretic display device comprising:
    a first electrode;
    a second electrode; and
    an electrophoretic display medium disposed between the first electrode and the second electrode and comprising a suspending medium and a ferroelectric material suspended in the suspending medium and coated with one or more pigments.

2. The electrophoretic display device of claim 1, wherein the ferroelectric material is suspended in the suspending medium as particles.

3. The electrophoretic display device of claim 2, wherein the particles have a spherical shape.

4. The electrophoretic display device of claim 2, wherein the particles have a non-spherical shape.

5. The electrophoretic display device of claim 1, wherein the ferroelectric material is a dislocation type ferroelectric material.

6. The electrophoretic display device of claim 5, wherein the dislocation type ferroelectric material is $BaTiO_3$, $NaKC_4H_4O_6/4H_2O$, GASH or TGS.

7. The electrophoretic display device of claim 1, wherein the ferroelectric material is an order-disorder type ferroelectric material.

8. The electrophoretic display device of claim 7, wherein the order-disorder type ferroelectric material is a polyvinyliden fluoride or a polyamide 11.

9. The electrophoretic display device of claim 1, wherein the suspending medium comprises an elastomer.

10. The electrophoretic display device of claim 1, wherein the suspending medium comprises a thixotropic material.

11. The electrophoretic display device of claim 1, wherein the display device is configured to operate in a field sequential color display mode.

12. A method of operating an electrophoretic display device, comprising:
    applying an electric field in a first direction so that ferroelectric particles coated with a first pigment and a second pigment are aligned in a first state in which the first pigment is positioned in a display side of the electrophoretic display device; and
    applying another electric field in a second direction different from the first direction so that the ferroelectric particles coated with the first pigment and the second pigment are aligned in a second state in which the second pigment is positioned in the display side of the electrophoretic display device.

13. An electrophoretic display device comprising:
    a first electrode;
    a second electrode; and
    an electrophoretic display medium disposed between the first electrode and the second electrode and comprising a suspending medium and a ferroelectric particles suspended in the suspending medium,
    wherein the ferroelectric particles are coated with a first pigment and a second pigment, and
    the electrophoretic device is configured such that an electric field is applied in a first direction so that ferroelectric particles are aligned in a first state in which the first pigment is positioned in a display side of the electrophoretic display device and configured such that another electric field is applied in a second direction different from the first direction so that the ferroelectric particles are aligned in a second state in which the second pigment is positioned in the display side of the electrophoretic display device.

* * * * *